United States Patent Office 3,763,226
Patented Oct. 2, 1973

3,763,226
3,5-SUBSTITUTED 2,4,6-TRIIODOBENZOIC ACIDS, ESTERS AND SALTS THEREOF
Bjorn Gustav-Adolf Ingelman, Uppsala, Sweden, assignor to Pharmacia AB, Uppsala, Sweden
No Drawing. Original application Dec. 26, 1968, Ser. No. 787,282, now Patent No. 3,632,736, dated Jan. 4, 1972. Divided and this application July 21, 1970, Ser. No. 56,952
Claims priority, application Sweden, Dec. 28, 1967, 17,896/67
Int. Cl. C07c 103/46
U.S. Cl. 260—490      20 Claims

ABSTRACT OF THE DISCLOSURE

Compounds of the formula:

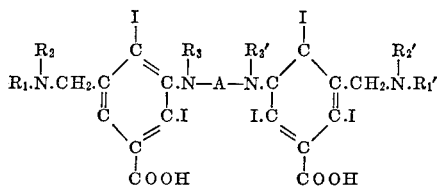

wherein $R_1$ and $R_1'$ are each hydrogen or lower alkyl having no more than 5 carbon atoms, $R_2$; $R_2'$; $R_3$; and $R_3'$ are each lower acyl having no more than 5 carbon atoms, and A is an alkylene group substituted by one or more substituents of the formula —O—$R_4$, wherein $R_4$ is hydrogen or lower alkyl or acyl having no more than 5 carbon atoms; the alkylene group containing 3–20 carbon atoms and being optionally broken by one or more oxygen bridges, or physiologically acceptable salts thereof are provided. Such compounds are especially suitable to be used for X-ray visualization of body cavities.

CROSS-REFERENCE TO RELATED CASES

This is a division of copending application Ser. No. 787,282 filed Dec. 26, 1968, and now U.S. Pat. 3,632,736.

The present invention relates to novel 3,5-substituted 2,4,6-triiodobenzoic acids adapted to be used for the X-ray visualization of body cavities.

More particularly, the present invention relates to compounds of the formula

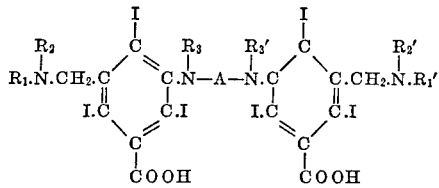

wherein $R_1$ and $R_1'$ are each hydrogen or lower alkyl having no more than 5 carbon atoms, $R_2$; $R_2'$; $R_3$; and $R_3'$ are each lower acyl having no more than 5 carbon atoms, and A is an alkylene group substituted by one or more substituents of the formula —O—$R_4$, wherein $R_4$ is hydrogen or lower alkyl or acyl having no more than 5 carbon atoms; the alkylene group containing 3–20 (for example 3–15) carbon atoms and being optionally broken by one or more oxygen bridges, or physiologically acceptable salts thereof. In the aforementioned formulae and likewise in the following the symbols with the same base index are normally the same, i.e. $R_1=R_1'$, $R_2=R_2'$ and $R_3=R_3'$, but they can also be different.

In a preferred embodiment each nitrogen atom in the bridge

is situated at a distance of two carbon atoms from a group of the formula —O—$R_4$. Preferably at most one hetero atom is bound to one and the same carbon atom in the bridge A. (The phrase "a hetero atom" is used to designate an atom other than a carbon or hydrogen atom.) The bridge A suitably contains 3–10 carbon atoms in the alkylene group.

The substituents $R_1$ and $R_1'$ may be, for instance, hydrogen, methyl or ethyl and substituents $R_2$, $R_2'$, $R_3$, and $R_3'$ may be, for instance acetyl or propionyl. $R_4$ is preferably hydrogen when hydrophilic compounds are desired. Consequently in most fields of use $R_4$ is preferably hydrogen. When compounds with more lipophilic characteristics are desired $R_4$ is chosen in the form of lower alkyl or acyl, for instance methyl or ethyl or acetyl or propionyl.

Examples of the bridge A in the aforementioned formulae are:

—CH$_2$.CH(OH).CH$_2$— or

—CH$_2$.CH(OH).CH$_2$.O.CH$_2$.CH(OH).CH$_2$— or

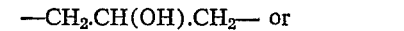
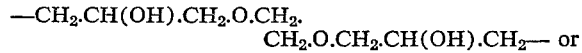
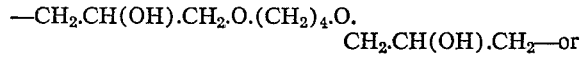
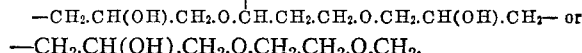
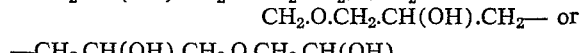
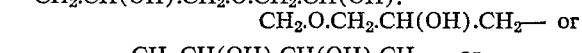
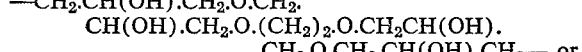
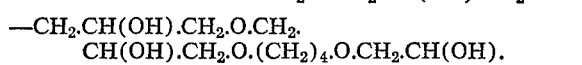

or any of the aforementioned bridges in which one or more hydroxyl groups have been alkylated or acylated with lower alkyl or acyl having no more than 5 carbon atoms e.g. methyl or ethyl or acetyl or propionyl.

Example of salts of the aforementioned compounds are sodium salt methylglucamine salts tris-hydroxy methyl-amino-methane salts, or some other non-toxic salts. These salts can be used in the form of an aqueous solution.

Examples of such compounds are:

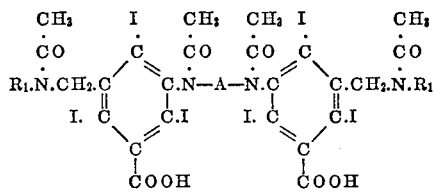

wherein $R_1$ and $R_1'$ are each hydrogen or methyl and wherein A is

—CH$_2$.CH(OH).CH$_2$.O.(CH$_2$)$_4$.
                                 O.CH$_2$.CH(OH).CH$_2$—
or

—CH$_2$.CH(OH).CH$_2$.O.(CH$_2$)$_2$.
                                 O.CH$_2$.CH(OH).CH$_2$—
or

—CH$_2$.CH(OH).CH$_2$.O.CH$_2$CH(OH).CH$_2$— or

—CH$_2$.CH(OH).CH$_2$.O.CH$_2$.CH(OH).
   CH$_2$.O.CH$_2$.CH(OH).CH$_2$— or

—CH$_2$.CH(OH).CH(OH).CH$_2$— or

—CH$_2$.CH(OH).CH$_2$— or any of the aforementioned bridges in which one or more hydroxyl groups have been alkylated or acrylated with lower alkyl or acyl having no more than 5 carbon atoms, e.g. methyl or ethyl or acetyl or propionyl, or physiologically acceptable salts thereof, e.g. sodium salts or methylglucamine salts.

The novel compounds are very useful as X-ray contrast agents. A preparation for carrying out X-ray investigations may conveniently comprise a mixture, such as an aqueous solution, or contain a physiologically acceptable solid carrier, the preparation preferably being in tablet form or in the form of some other convenient dosage unit, which mixture contains one or more of the aforementioned compounds as an active contrast producing substance.

When applying a preparation containing a contrast-producing agent according to the invention the contrast-producing agent is administered to the body of the test object, whereafter the body is exposed to X-rays, and photographs may be taken, or the image may be observed direct on a fluorescence screen, or some other X-ray method may be used in a conventional manner. The dose of contrast-producing agent administered is selected according to the category of investigation, so that a sufficient contrast effect is obtained.

One example of the different body cavities which can be visibilized by means of the compounds according to the invention or by preparations containing one or more of said compounds is the gastrointestinal tract. In this instance the contrast-producing agent is administered perorally in solid or solution form. It is also possible to visibilize the intestines by administering the contrast-producing agent rectally, in the form of an enema. Another example is the visibilization of blood vessels upon injecting the contrast-producing agent in the form of a sterile solution. Subsequent to being injected intravenously, the contrast-producing agent is excreted with the urine and enables the renal pelvis, ureters and bladders to be visibilized. Further examples are the use of the compounds of the invention in hysterosalpingography, cholangiography, lymphography, urethrography and sialography.

The novel compounds according to the invention have a low toxicity, e.g. when administered intravenously, and present excellent characteristics as X-ray contrast-producing agents. They also present good stability.

Carriers for the novel compounds may be conventional additive substances, such as water with regard to injection solutions and usual adjuvants when in tablet form.

If the preparation containing a compound according to the invention is in the form of an aqueous solution the concentration of the active compound used is selected in dependence on the field of use. Preferably a content exceeding 10 grams per 100 ml. of solution is chosen.

Normally, however, a much higher content is selected, e.g. in the order of 20, 30, 40 or 50 grams or more per 100 ml. of solution.

The aforementioned novel 3,5-substituted 2,4,6-triiodobenzoic acids may be prepared, for instance, by reacting a compound of the formula

Y.A.X wherein A has the aforementioned significance, R$_4$ preferably being hydrogen and wherein Y and X are each halogen, preferably chloro or bromo, or corresponding epoxide compounds obtainable from the compound Y.A.X by splitting off hydrogen halide, with one mole of a compound of the formula

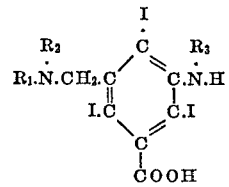

or salts thereof, wherein R$_1$, R$_2$ and R$_3$ each have the aforementioned significance, and with 1 mole of a compound with the formula

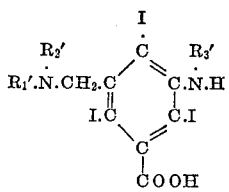

or salts thereof, wherein R$_1'$. R$_2'$ and R$_3'$ each have the aforementioned significance. The obtained compounds are recovered either as dicarboxylic acids or in the form of physiologically acceptable salts.

Examples of such salts are sodium salt, or methyl glucamine salt. Sodium and methyl glucamine salts have satisfactory solubility in water.

If R$_1$ and/or R$_1'$ is hydrogen minor quantities of secondary products can be obtained as these hydrogen atoms have a certain but low reactivity. The formation of such secondary products can be suppressed if desired by selecting mild reaction conditions and an excess of the iodomonocarboxylic acids in relation to the bridge formers. (The excess hereof can be recovered and used in the next batch.) Neither need the monocarboxylic acids and said secondary products be removed since they are acceptable to the body. If it is desired to completely avoid formation of such secondary products R$_1$ and R$_1'$ are selected in the form of lower alkyl, e.g. methyl.

Examples of the bifunctional compounds of the type Y.A.X or corresponding epoxide compounds obtainable by splitting off hydrogen halide are:

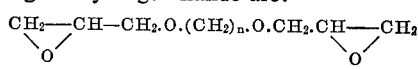

where $n$ is an integer from 2 to 4 inclusive, and

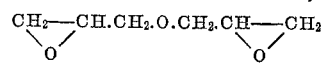

and

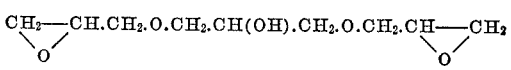

or corresponding halogen hydrins, and bifunctional glycerine derivatives of the formula

X.CH$_2$.CH(OH).CH$_2$—Y e.g. dichlorohydrin and dibromohydrin, or corresponding epoxy compounds obtainable by splitting off hydrogen halide and having the formula

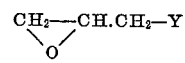

e.g. epichlorohydrin or epibromohydrin. Another example of such a bifunctional compound is 1,2-3,4-diepoxybutane.

The reaction is preferably carried out in a solvent, e.g. water, or an aqueous liquid, and there is suitably added alkaline reacting substances, e.g. alkali-metal hydroxides, the alkaline substance acting as a catalyst. The alkaline substance can also function as an acceptor for any hydrogen halide liberated during the reaction. If it is desired to convert one or more hydroxyl groups in the bridge to alkylated or acylated hydroxyl groups, the obtained compounds are treated with an alkylating agent or acylating agent, e.g. dimethylsulphate or acetic acid anhydride in a conventional manner for alkylating or acylating hydroxyl groups.

The reaction can be carried out at different temperatures, e.g. between 0 and 50° C., such as 20° C.

EXAMPLE 1

0.1 mole of 3-acetylamino-5-acetylaminomethyl-2,4,6-triiodobenzoic acid was dissolved in 50 ml. of an aqueous 4 N solution of sodium hydroxide, 0.05 mole of bis-[2,3-epoxypropyl]-ether was slowly added dropwise to the solution at 20° C. whilst stirring. The reaction mixture was then allowed to stand for one day at 20° C., whereafter 6 N HCl was added in an amount sufficient to precipitate the dicarboxylic acid formed in the reaction. The acid was cleansed by washing with water and reprecipitation, and then dried in vacuum at 50° C. The yield of dicarboxylic acid was approximately 50–60 grams. The obtained product can be further cleansed by solution and precipitation.

Solutions can be prepared from the obtained acid by adding water and, for instance, equivalent quantities of sodium hydroxide or methylglucamine.

EXAMPLE 2

0.1 mole of 3-acetylamino-5-acetylaminomethyl-2,4,6-triiodobenzoic acid was dissolved in 50 ml. of an aqueous 4 N solution of sodium hydroxide. 0.05 mole of 1,2-ethanedioldiglycide ether were slowly added dropwise to the solution at 20° C. whilst stirring. The reaction mixture was then allowed to stand for one day at 20° C., whereafter 6 N HCl were added in an amount sufficient to precipitate the dicarboxylic acid formed in the reaction. The acid was cleansed by washing with water and reprecipitation, and was dried in a vacuum at 50° C. The yield of dicarboxylic acid was approximately 50–60 grams. The obtained product can be further cleansed by solution and precipitation.

Solutions can be prepared from the obtained acid by adding water and, for instance, equivalent quantities of sodium hydroxide or methyl glucamine.

EXAMPLE 3

0.1 mole of 3-acetylamino-5-acetylaminomethyl-2,4,6-triiodobenzoic acid were dissolved in 50 ml. of an aqueous 4 N solution of sodium hydroxide. 0.05 mole of 1,4-butanedioldiglycide ether was slowly added to the solution dropwise at 20° C. whilst stirring. The reaction mixture was then allowed to stand for one day at 20° C., whereafter 6 N HCl were added in an amount sufficient to precipitate the dicarboxylic acid formed in the reaction. The acid was cleansed by washing and reprecipitation, and dried in vacuum at 50° C. The yield of dicarboxylic acid was about 50–60 grams. The obtained product can be further cleansed by a further dissolution and precipitation process.

The obtained product can then be converted into salts, from which aqueous solutions can be prepared as in Examples 1 and 2.

EXAMPLE 4

In a manner similar to that defined in Example 1, 0.1 mole of 3-acetylamino-5-acetylaminomethyl-2,4-6-triiodobenzoic acid were reacted with 0.05 mole epichlorohydrin or with 0.05 mole of epibromohydrin or with 0.05 mole dichlorohydrin.

The resulting dicarboxylic acid was cleansed in the manner described in Example 1.

EXAMPLE 5

Solutions were prepared from each of the dicarboxylic acids obtained in Examples 1, 2, 3 and 4 in the following manner:

40 grams of substance and equivalent amounts of methyl glucamine were dissolved in water to a solution volume of 100 ml. pH was adjusted to 7.3–7.4. The solution was filtered and poured into bottles, which were sealed and sterilized in an autoclave.

EXAMPLE 6

The solutions from Example 5 were injected in the blood vessels of rabbits, whereafter the blood vessels could be visibilized by X-rays and photographs.

Subsequent X-ray exposure and photographing of the gastro-area showed excellent contrast filling of the renal pelvis, ureters and bladders.

EXAMPLE 7

Solutions from Example 5 were administered orally to rabbits, whereafter the gastro-intestinal tract could be visibilized by X-rays and photographs, with excellent results.

EXAMPLE 8

Solutions of sodium salts of the compounds prepared in a manner similar to that described in Example 5 and containing 20 grams of the dicarboxylic acids per 100 ml. of solution were administered rectally to rabbits in the form of an enema, whereafter the intestines could be observed by X-rays and photographs, with good results.

What I claim is:

1. A compound selected from the group consisting of (1) compounds of the formula

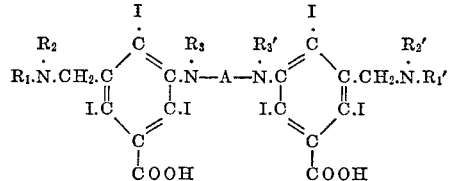

wherein $R_1$ and $R_1'$ are each a member selected from the group consisting of hydrogen and lower alkyl having no more than 5 carbon atoms and $R_2$; $R_2'$; $R_3$ $R_3'$ are each lower alkanoyl having no more than 5 carbon atoms, and wherein A is an alkylene group substituted by at least one substituent of the formula —O—$R_4$, wherein $R_4$ is a member selected from the group consisting of hydrogen, lower alkyl and alkanoyl having no more than 5 carbon atoms, said alkylene group containing 3–20 carbon atoms, and (2) physiologically acceptable salts thereof.

2. A compound as claimed in claim 1, wherein each nitrogen atom in the bridge

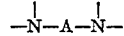

is situated at a distance of two carbon atoms from a group —O—$R_4$ and wherein not more than one oxygen atom is bound to one and the same carbon atom in the bridge A.

3. A compound as claimed in claim 1, wherein the bridge A is a member selected from the group consisting of

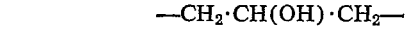

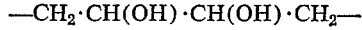

and the aforesaid bridges in which at least one hydroxyl group is alkylated with lower alkyl having no more than 5 carbon atoms.

4. A compound as claimed in claim 1, wherein the bridge A is a member selected from the group consisting of

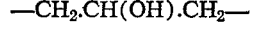

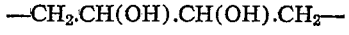

and the aforesaid bridges in which at least one hydroxyl group is alkanoylated with lower alkanoyl having no more than 5 carbon atoms.

5. A compound as claimed in claim 1, wherein $R_1$ and $R_1'$ are each a member selected from the group consisting of hydrogen, methyl and ethyl and $R_2$, $R_2'$, $R_3$ and $R_3'$ are each a member selected from the group consisting of acetyl and propionyl and $R_4$ is a member selected from the group consisting of hydrogen, methyl, ethyl, acetyl and propionyl.

6. A compound selected from the group consisting of (1) compounds of the formula

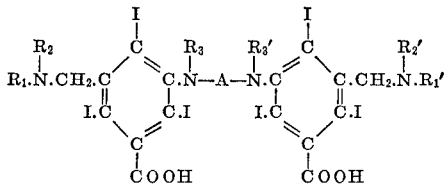

wherein $R_1$ and $R_1'$ are each a member selected from the group consisting of hydrogen and lower alkyl having no more than 5 carbon atoms and $R_2$, $R_2'$, $R_3$ and $R_3'$ are each lower alkanoyl having no more than 5 carbon atoms and wherein A is an alkylene group substituted by at least one substituent of the formula —O—$R_4$, wherein $R_4$ is a member selected from the group consisting of hydrogen, lower alkyl and alkanoyl having no more than 5 carbon atoms, said alkylene group containing 3–20 carbon atoms and being broken by at least one oxygen bridge, and (2) physiologically acceptable salts thereof.

7. A compound as claimed in claim 6, wherein each nitrogen atom in the bridge

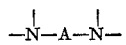

is situated at a distance of two carbon atoms from a group —O—$R_4$, and wherein not more than one oxygen atom is bound to one and the same carbon atom in the bridge A.

8. A compound as claimed in claim 6, wherein the bridge A is a member selected from the group consisting of

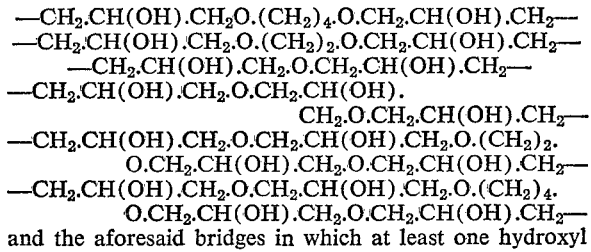

and the aforesaid bridges in which at least one hydroxyl group is alkylated with lower alkyl having no more than 5 carbon atoms.

9. A compound as claimed in claim 6, wherein the bridge A is a member selected from the group consisting of

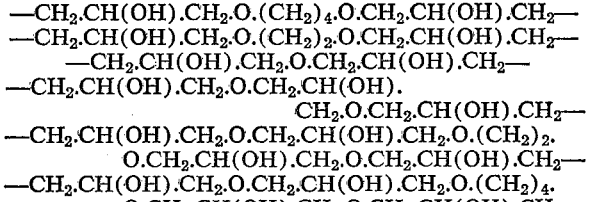

and the aforesaid bridges in which at least one hydroxyl group is alkanoylated with lower alkanoyl having no more than 5 carbon atoms.

10. A compound as claimed in claim 6, wherein $R_1$ and $R_1'$ are each a member selected from the group consisting of hydrogen, methyl and ethyl, and $R_2$, $R_2'$, $R_3$ and $R_3'$ are each a member selected from the group consisting of acetyl and propionyl and $R_4$ is a member selected from the group consisting of hydrogen, methyl, ethyl, acetyl, and propionyl.

11. A compound selected from the group consisting of (1) compounds of the formula

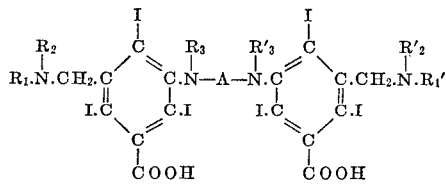

wherein $R_1$ and $R_1'$ are each a member selected from the group consisting of hydrogen and lower alkyl having no more than 5 carbon atoms and $R_2$; $R_2'$; $R_3$ and $R_3'$ are each lower alkanoyl having no more than 5 carbon atoms, and wherein A is an alkylene group substituted by at least one substituent of the formula —O—$R_4$, wherein $R_4$ is a member selected from the group consisting of hydrogen, lower alkyl and alkanoyl having no more than 5 carbon atoms, said alkylene group containing 3–10 carbon atoms, and (2) physiologically acceptable salts thereof.

12. A compound as claimed in claim 11, wherein each nitrogen atom in the bridge

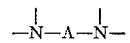

is situated at a distance of two carbon atoms from a group —O—$R_4$ and wherein not more than one oxygen atom is bound to one and the same carbon atom in the bridge A.

13. A compound as claimed in claim 11, wherein the bridge A is a member selected from the group consisting of

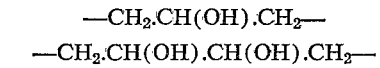

and the aforesaid bridges in which at least one hydroxyl group is alkylated with lower alkyl having no more than 5 carbon atoms.

14. A compound as claimed in claim 11, wherein the bridge A is a member selected from the group consisting of

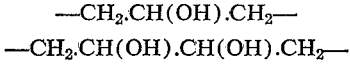

and the aforesaid bridges in which at least one hydroxyl group is alkanoylated with lower alkanoyl having no more than 5 carbon atoms.

15. A compound as claimed in claim 11, wherein $R_1$ and $R_1'$ are each a member selected from the group consisting of hydrogen, methyl and ethyl and $R_2$, $R_2'$, $R_3$ and $R_3'$ are each a member selected from the group consisting of acetyl and propionyl and $R_4$ is a member selected from the group consisting of hydrogen, methyl, ethyl, acetyl and propionyl.

16. A compound selected from the group consisting of (1) compounds of the formula

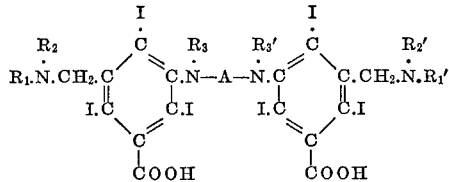

and wherein $R_1$ and $R_1'$ are each a member selected from the group consisting of hydrogen and lower alkyl having no more than 5 carbon atoms and $R_2$, $R_2'$, $R_3$ and $R_3'$ are each lower alkanoyl having no more than 5 carbon atoms and wherein A is an alkylene group substituted by at least one substituent of the formula —O—$R_4$, wherein $R_4$ is a member selected from the group consisting of hydrogen, lower alkyl and alkanoyl having no more than 5 carbon atoms, said alkylene group containing 3-10 carbon atoms and being broken by at least one oxygen bridge, and (2) physiologically acceptable salts thereof.

17. A compound as claimed in claim 16, wherein each nitrogen atom in the bridge

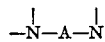

is situated at a distance of two carbon atoms from a group —O—$R_4$, and wherein not more than one oxygen atom is bound to one and the same carbon atom in the bridge A.

18. A compound as claimed in claim 16, wherein the bridge A is a member selected from the group consisting of

—$CH_2CH(OH).CH_2.O.(CH_2)_4.O.CH_2.CH(OH).CH_2$—

—$CH_2.CH(OH).CH_2.O.(CH_2)_2.O.CH_2.CH(OH).CH_2$—

—$CH_2.CH(OH).CH_2.O.CH_2.CH(OH).CH_2$—

—$CH_2.CH(OH).CH_2.O.CH_2.CH(OH).$
$CH_2.O.CH_2.CH(OH).CH_2$— and the aforesaid bridges in which at least one hydroxyl group is alkylated with lower alkyl having no more than 5 carbon atoms.

19. A compound as claimed in claim 16, wherein the bridge A is a member selected from the group consisting of

—$CH_2.CH(OH).CH_2.O.(CH_2)_4.O.CH_2.CH(OH).CH_2$—

—$CH_2.CH(OH).CH_2.O.(CH_2)_2.O.CH_2.CH(OH).CH_2$—

—$CH_2.CH(OH).CH_2.O.CH_2.CH(OH).CH_2$—

—$CH_2.CH(OH).CH_2.O.CH_2.CH(OH).$
$CH_2.O.CH_2.CH(OH).CH_2$— and the aforesaid bridges in which at least one hydroxyl group is alkanoylated with lower alkanoyl having no more than 5 carbon atoms.

20. A compound as claimed in claim 16, wherein $R_1$ and $R_1'$ are each a member selected from the group consisting of hydrogen, methyl and ethyl, and $R_2$, $R_2'$, $R_3$ and $R_3'$ are each a member selected from the group consisting of acetyl and propionyl and $R_4$ is a member selected from the group consisting of hydrogen, methyl, ethyl, acetyl, and propionyl.

References Cited
UNITED STATES PATENTS 2,853,424  9/1958  Priewe et al. _____ 260—519
3,654,272  4/1972  Felder et al. _____ 260—519

VIVIAN GARNER, Primary Examiner

U.S. Cl. X.R.

260—211 R, 501.11, 519; 424—5

UNITED STATES PATENT OFFICE
CERTIFICATE OF CORRECTION

Patent No. 3,763,226    Dated October 2, 1973

Inventor(s) INGELMAN

It is certified that error appears in the above-identified patent and that said Letters Patent are hereby corrected as shown below:

The formula in the Abstract should read as follows:

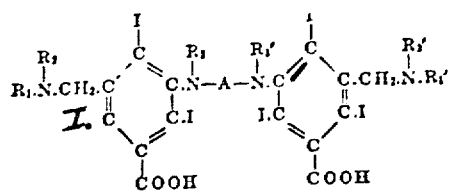

Column 1, lines 48-57, the formula should read as follows:

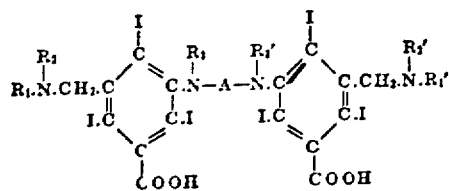

In column 3, line 9, change "acrylated" to ---acylated---.

Signed and sealed this 23rd day of April 1974.

(SEAL)
Attest:

EDWARD M. FLETCHER, JR.
Attesting Officer

C. MARSHALL DANN
Commissioner of Patents